United States Patent [19]

Preiner et al.

[11] Patent Number: 4,533,477
[45] Date of Patent: Aug. 6, 1985

[54] ORGANOPOLYSILOXANES HAVING SiC-BONDED OXYALKYLENE UNITS AND A METHOD FOR PREPARING THE SAME

[75] Inventors: Gerhard Preiner; Karl Huhn; Johann Müller; Heinrich Marwitz; Kurt Ullrich, all of Burghausen, Fed. Rep. of Germany

[73] Assignee: Wacker-Chemie GmbH, Munich, Fed. Rep. of Germany

[21] Appl. No.: 536,476

[22] Filed: Sep. 28, 1983

[30] Foreign Application Priority Data

Dec. 23, 1982 [DE] Fed. Rep. of Germany ....... 3247825

[51] Int. Cl.$^3$ .............................................. B05D 3/02
[52] U.S. Cl. .................................... 252/8.9; 427/387; 427/389.9; 427/393.4; 528/15; 528/32; 528/33; 528/34
[58] Field of Search ................... 427/387, 389.9, 393.4; 528/15, 32, 33, 43; 252/8.6, 8.9

[56] References Cited

U.S. PATENT DOCUMENTS

| | | | |
|---|---|---|---|
| 3,628,996 | 12/1971 | Weber | 427/387 |
| 4,322,518 | 3/1982 | Blizzard | 528/15 |
| 4,370,365 | 1/1983 | Takamizawa et al. | 427/387 |
| 4,395,443 | 7/1983 | Shimizu et al. | 427/387 |
| 4,399,193 | 8/1983 | Preiner et al. | 428/447 |
| 4,409,267 | 10/1983 | Ichinohe et al. | 427/393.4 X |

*Primary Examiner*—Thurman K. Page

[57] ABSTRACT

Organopolysiloxanes having SiC-bonded oxyalkylene units and Si-bonded hydroxyl groups, in which an average of at least 15 mol percent of the siloxane units contain only one SiC-bonded monovalent organic radical and the silicon valences which are not satisfied by the SiC-bonded monovalent organic radical are satisfied by siloxane oxygen atoms or oxygen atoms of hydroxyl groups. These organopolysiloxanes are preferably prepared by reacting triorganosiloxy end-blocked organopolysiloxanes consisting of diorganosiloxane units, in which at least part of these units contain SiC-bonded oxyalkylene units and, if appropriate, organohydrogensiloxane units or organohydroxyl siloxane units or organoalkoxysiloxane units of mixtures of at least two such monoorganosiloxy units with water in the presence of an acid or base or, and subsequently with a silane or simultaneously with water and a silane in which the silane contains one SiC-bonded monovalent organic radical, or partially hydrolyzed products of the silane. The new organopolysiloxanes are applied to textile fibers to impart hydrophilic properties thereto.

18 Claims, No Drawings

ORGANOPOLYSILOXANES HAVING SIC-BONDED OXYALKYLENE UNITS AND A METHOD FOR PREPARING THE SAME

The present invention relates to organopolysiloxanes having SiC-bonded oxyalkylene units, particularly to a method for preparing the organopolysiloxanes having SiC-bonded oxyalkylene units and more particularly to a method for rendering textile fibers hydrophilic by treating the fibers with the organopolysiloxanes having SiC-bonded oxyalkylene units.

BACKGROUND OF THE INVENTION

Organopolysiloxanes having SiC-bonded oxyalkylene units and Si-bonded hydroxyl groups are known in the art. For example, European patent application No. 0 032 310 to Union Carbide Corporation, and German patent application (Offenlegungsschrift) No. 30 39 721, to Wacker-Chemie GmbH disclose organopolysiloxanes having SiC-bonded oxyalkylene units. These organopolysiloxanes may be applied to substrates and cross-linked to impart hydrophilic properties to the coated substrates, that is, the coated substrates can be wetted to some degree more quickly and readily with water. However, the European patent application shows in Table 2, Examples 1 and 2, that the organopolysiloxanes prepared in accordance with the European patent application do not provide desirable water wettability to fibers containing 100 percent polyester.

Therefore, it is an object of the present invention to provide organopolysiloxanes having SiC-bonded oxyalkylene units. Another object of the present invention is to provide organopolysiloxanes having SiC-bonded oxyalkylene units which can be applied to textile fibers to impart hydrophilic properties thereto. Still another object of the present invention is to prepare organopolysiloxanes having SiC-bonded oxyalkylene units and Si-bonded hydroxyl groups which can be cross-linked by condensation and which impart hydrophilic properties to natural fibers as well as substrates consisting of 100 percent synthetic fibers. Still another object of this invention is to provide a hydrophilic coating which is particularly durable to cleaning with water or organic solvents without impairing other desired properties of the fibers such as soft hand and resilience.

SUMMARY OF THE INVENTION

The foregoing objects and others which are apparent from the following description are accomplished in accordance with this invention, generally speaking, by providing organopolysiloxanes having SiC-bonded oxyalkylene units and Si-bonded hydroxyl groups, in which an average of at least 15 mol percent of the siloxane units have only one SiC-bonded monovalent organic radical and the silicon valences other than the one satisfied by the SiC-bonded monovalent organic radical are satisfied by siloxane oxygen atoms or the oxygen atoms of hydroxyl groups.

These organopolysiloxanes are prepared by reacting triorganosiloxy end-blocked organo(poly)siloxanes consisting of diorganosiloxane units in which a part of these units contain SiC-bonded oxyalkylene units with water in the presence of an acid or base or with water and a silane having only one SiC-bonded monovalent organic radical or partially hydrolyzed products of the silane. The resultant organopolysiloxanes may be applied to textile fibers to impart hydrophilic properties thereto.

DESCRIPTION OF THE INVENTION

The organopolysiloxanes consisting of siloxane units having only one SiC-bonded monovalent organic radical in which the silicon valences other than the one satisfied by this radical are satisfied by silicon oxygen atoms or the oxygen atoms of hydroxyl groups can be represented by the following formulas:

R SiO$_{3/2}$
R Si(OH)O and
R Si(OH)$_2$O$_{\frac{1}{2}}$ where R represents the same or different monovalent organic radicals.

Preferably, the organopolysiloxanes of this invention contain on the average at most 60 mol percent of siloxane units having only one SiC-bonded monovalent organic radical and the silicon valences other than the one satisfied by the organic radical are satisfied by siloxane oxygen atoms or the oxygen atoms of hydroxyl groups.

Siloxane units other than the units having only one SiC-bonded monovalent organic radical in which the silicon valences other than the one satisfied by this radical are satisfied by siloxane oxygen atoms or oxygen atoms of hydroxyl groups, are preferably those having the following formulas:

R$_2$SiO
R$_2$Si(OH)O$_{\frac{1}{2}}$ or
R$_3$SiO$_{\frac{1}{2}}$ where R is the same as above. Other siloxane units which may also be present are SiO$_{4/2}$ or Si(OH)O$_{3/2}$ units.

In order for the organopolysiloxanes of this invention to contain SiC-bonded oxyalkylene units, at least part of the SiC-bonded organic radicals in these organopolysiloxanes and thus at least part of the R radicals must, of course, contain oxyalkylene units. The preferred oxyalkylene units are those having the following formula:

$$-(CH_2)_m(OCHR^1CH_2)_nOX,$$

where R$^1$ represents hydrogen or the same or different alkyl radicals having from 1 to 4 carbon atoms per radical, preferably hydrogen; X represents hydrogen or alkyl radicals having from 1 to 4 carbon atoms per radical or acyl radicals having from 1 to 5 carbon atoms, preferably at most 3 carbon atoms per radical; m is 2, 3, 4, 5 or 6, preferably 3; and n is an integer having a value of from 1 to 30, especially 3, 4, 5 or 6. Preferably, X represents hydrogen or an acyl radical and in particular, the acetyl radical.

It is preferred that the organopolysiloxanes of this invention contain an average of at least 0.5 SiC-bonded oxyalkylene units, more preferably an average of at least one SiC-bonded oxyalkylene unit, and even more preferably an average of from 3 to 6 SiC-bonded oxyalkylene units per molecule. Furthermore, it is preferred that at most only one organic radical having at least one oxyalkylene unit be linked to a single silicon atom and that the SiC-bonded monovalent radicals containing oxyalkylene units be present in the R$_2$SiO or R$_2$Si(OH)O$_{\frac{1}{2}}$ units.

Examples of SiC-bonded monovalent organic radicals other than the radicals having oxyalkylene units in the organopolysiloxanes of this invention, are in particular alkyl radicals having from 1 to 8 carbon atoms per radical such as the methyl, ethyl, n-propyl, and isopropyl radicals as well as butyl and octyl radicals; aliphatic radicals having an olefinic double bond and from 1 to 8 carbon atoms per radical such as the vinyl, allyl, and methallyl radicals; cycloalkyl radicals having from 5 to 8 carbon atoms per radical such as the cyclohexyl radical or methylcyclohexyl radicals; aryl radicals such as the phenyl radical; alkaryl radicals having 7 or 8 carbon atoms per radical such as the tolyl radicals; and aralkyl radicals having 7 or 8 carbon atoms per radical such as the benzyl radical. However, because of their availability, it is preferred that at least 80 percent of the number of SiC-bonded monovalent organic radicals other than the radicals having the oxyalkylene units in the organopolysiloxanes be methyl radicals.

Preferably, the organopolysiloxanes of this invention have an average of from 3 to 1,000 silicon atoms per molecule, more preferably at least 20 silicon atoms per molecule, and at least two Si-bonded hydroxyl groups per molecule.

Another embodiment of this invention is the preparation of the organopolysiloxanes having SiC-bonded oxyalkylene units and Si-bonded hydroxyl groups, in which an average of at least 15 mol percent of the siloxane units have only one SiC-bonded monovalent organic radical and the silicon valences other than the one satisfied by the SiC-bonded monovalent organic radical are satisfied by siloxane oxygen atoms or oxygen atoms of hydroxyl groups. These organopolysiloxanes are prepared by reacting a triorganosiloxy end-blocked diorgano(poly)siloxane which contains SiC-bonded oxyalkylene units or a triorganosiloxy end-blocked copolymer which consists of such a diorgano(poly)siloxane and siloxane units which contain one SiC-bonded monovalent organic radical and one Si-bonded hydrogen atom or one Si-bonded hydroxyl group or one SiOC-bonded alkoxy group having from 1 to 4 carbon atoms per group with water in the presence of an acid or base. If, however, the organopolysiloxane thus obtained from this reaction still does not contain sufficient siloxane units having only one SiC-bonded monovalent organic radical and the silicon valences other than the one satisfied by this radical are satisfied by siloxane oxygen atoms or oxygen atoms of hydroxyl groups, then simultaneously with the reaction with water or subsequent to the reaction with water, the organopolysiloxane is also reacted with a silane whose silicon atom carries only one SiC-bonded monovalent organic radical and the silicon valences other than the one satisfied by this radical are satisfied by hydrolyzable radicals or halogen atoms, or with the partially hydrolyzed product of such silane.

The triorganosiloxy end-blocked diorgano(poly)siloxane which contains SiC-bonded oxyalkylene units can be represented by the formula:

$$R_3SiO(SiR_2O)_pSiR_3$$

in which R is the same as above and p is an integer having a value of at least 1. Such organo(poly)siloxanes are, for example, prepared in a known manner, for example, by the addition of an ether having the following general formula:

$$CH_2=CH(CH_2)_{m'}(OCHR^1CH_2)_nOX,$$

where $R^1$ and X are the same as above and m' is 0, 1, 2, 3 or 4, and more preferably 1, to an organo(poly)siloxane having the general formula:

$$R_3^2SiO(SiR_2^2O)_{p'}(SiHR^2O)_qSiR_3^2$$

where $R^2$ represents the same or different SiC-bonded monovalent organic radicals other than the radicals having oxyalkylene units of the type indicated above, particularly methyl radicals; p' is 0 or an integer having a value of at least 1; q is an integer having a value of at least 1; and p'+q is equal to p. This addition reaction is generally carried out in the presence of a platinum catalyst, such as $H_2PtCl_6.6H_2O$. If in this addition reaction only part of the Si-bonded hydrogen atoms are reacted with the ether having the formula indicated above, a triorganosiloxy end-blocked copolymer is obtained which consists of a diorgano(poly)siloxane containing SiC-bonded oxyalkylene units and siloxane units in which each such siloxane unit contains one Si-bonded monovalent organic radical and one SiC-bonded hydrogen atom. If, however, during the addition reaction Si-bonded hydrogen atoms are reacted not only with the ethers having the formula indicated above, but also with water or an alkanol having from 1 to 4 carbon atoms or with water and an alkanol having from 1 to 4 carbon atoms, in the presence of an acid or base, then a triorganosiloxy end-blocked copolymer is obtained which consists of a diorgano(poly)siloxane containing SiC-bonded oxyalkylene units and siloxane units which contain one SiC-bonded radical and the silicon valences other than the one satisfied by this radical and a siloxane oxygen atom are satisfied by the oxygen atom of an hydroxyl group or an alkoxy group having from 1 to 4 carbon atoms per radical or hydrogen.

In the reaction of the triorganosiloxy end-blocked diorgano(poly)siloxane which contains SiC-bonded oxyalkylene units or in the reaction of the triorganosiloxy end-blocked copolymer which consists of such diorgano(poly)siloxane and siloxane units where each such siloxane unit contains one SiC-bonded monovalent organic radical and one Si-bonded hydrogen atom or one Si-bonded hydroxyl group or one SiOC-bonded alkoxy group which has from 1 to 4 carbon atoms per group with water, the water is preferably used in an amount of from 0.1 to 20 weight percent, and more preferably from 1 to 5 weight percent, based on the weight of the organopolysiloxane which is reacted with the water.

The preferred acids or bases are those which promote the reaction of water with the organopolysiloxane, but do not promote the rearrangement of siloxane bonds or as little as possible. Hydrogen chloride and sodium hydroxide are examples of suitable acids and bases. The acids are the preferred catalysts.

The acid or base is preferably used in an amount of from about 0.05 to 10 weight percent, and more particularly from about 0.5 to 2 weight percent, based on the weight of the organopolysiloxane which is reacted with the water.

The silane whose silicon atom contains only one SiC-bonded monovalent organic radical and the other unsatisfied silicon valences are satisfied by hydrolyzable radicals or halogen atoms can be represented by the formula:

$$RSiY_3$$

in which R is the same as above and is preferably the methyl radical; Y represents halogen atoms such as chlorine, bromine, or iodine, in particular chlorine, or radicals which can be hydrolyzed such as alkoxy groups having from 1 to 4 carbon atoms per group, or acyloxy groups having up to 4 carbon atoms per group, such as the acetoxy group. Alkoxy groups, and in particular methoxy or ethoxy groups, are preferred examples of Y.

The organopolysiloxane is preferably reacted with water or with water and a silane whose silicon atom contains only one SiC-bonded monovalent organic radical or a partially hydrolyzed product thereof at a temperature of from 50° C. to 180° C., and in particular from 80° C. to 120° C. Preferably, the reaction is conducted at ambient atmospheric pressure, that is, at 1010 mbar (abs.) or at approximately 1010 mbar (abs.). However, higher or lower pressures can also be used, if desired.

If the organopolysiloxane of this invention is prepared using an additional silane or a partially hydrolyzed product thereof or the silane and the partially hydrolyzed product thereof according to the method described above, then the reaction is preferably conducted in the presence of a solvent which is inert with respect to the reactants and the reaction products. It is preferred that at least a portion of the solvent employed be a solvent for the reactants. Examples of solvents which are inert with respect to the reactants and in which all reactants are soluble are tetrahydrofuran, isopropanol, and acetone. Tetrahydrofuran is the preferred solvent. Toluene is another example of a solvent which can also be used in the preparation of organopolysiloxanes in accordance with this invention.

Preferably, the solvent is used in an amount of from 10 to 50 weight percent, based on the total weight of water, organopolysiloxane and silane or partially hydrolyzed product thereof.

In still another embodiment of this invention textile fibers are rendered hydrophilic by applying organopolysiloxanes having SiC-bonded oxyalkylene units and Si-bonded hydroxyl groups to fibers which are to be rendered hydrophilic, in which the organopolysiloxanes have SiC-bonded oxyalkylene units and Si-bonded hydroxyl groups and an average of at least 15 mol percent of the siloxane units have only one SiC-bonded monovalent organic radical and the unsatisfied valences are satisfied by siloxane oxygen atoms or the oxygen atoms of hydroxyl groups.

Preferably the organopolysiloxanes used in treating the fibers to impart hydrophilic properties thereto are the organopolysiloxanes of this invention or those prepared in accordance with the method of this invention.

Any textile fiber can be rendered hydrophilic with the method of this invention. The fibers may be natural or synthetic fibers such as those made of keratin, cotton, rayon, hemp, natural silk, polypropylene, polyethylene, polyester, polyurethane, polyamide, cellulose acetate, or mixtures of such fibers. The fibers can be present as threads, yarns, fleeces, mats, fabrics, knitted or woven textiles, including articles of clothing or parts of articles of clothing. Also, the method of this invention may be used to treat fibers which are hydrophilic by nature such as cotton or other kinds of cellulose fibers. It is especially beneficial to treat these fibers with the method of this invention where, for example, such fibers have lost or will partially lose their hydrophilic properties with a "durable-press" finish.

The organopolysiloxanes of this invention and those preferably prepared in accordance with this invention may be applied to fibers which are to be rendered hydrophilic by any method or manner known in the art for treating fibers with liquids, such as for example, by immersing, spreading, pouring, spraying, including spraying from aerosol containers, rolling, or padding.

In the method of this invention for rendering textile fibers hydrophilic, the organosilicon compounds are preferably applied in the form of aqueous solutions or aqueous emulsions. If desired, the organosilicon compounds used in the method of this invention to render textile fibers hydrophilic can also be used in the form of solutions in organic solvents which are inert with respect to the organosilicon compounds. Examples of suitable organic solvents are toluene, mixtures of xylene isomers, perchloroethylene, or alkane mixtures having a boiling range of from 135° C. to 180° C. at 1013 mbar (abs.).

Preferably, the weight increase of the fibers after treatment with the organosilicon compounds of this invention for imparting hydrophilic properties to textile fibers and evaporation of the medium, such as water, is from 0.1 to 20 weight percent, and more preferably from about 0.5 to 3 weight percent, based on the weight of the fibers prior to treatment.

Preferably, the organopolysiloxanes applied in accordance with this invention to textile fibers to impart hydrophilic properties thereto are cross-linked by condensation on the fibers. However, when the fibers contain hydroxyl groups, such as cotton, cross-linking is not absolutely necessary because the organopolysiloxanes of this invention may be anchored to the fibers by reacting the Si-bonded hydroxyl groups of the organopolysiloxanes of this invention with the hydroxyl groups of the fibers.

Preferred cross-linking agents for cross-linking the organopolysiloxanes of this invention are silanes having the general formula:

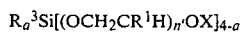

and partially hydrolyzed products thereof. In the above formula, $R^1$ and X are the same as above except that when X is hydrogen, n' is at least 1; n' is 0 or an integer having a value of from 1 to 30; a is 1, or 2, preferably 1; and $R^3$ is an alkyl radical substituted with at least one amino or imino group or is the same as $R^1$.

Suitable examples of such silanes are methyltriacetoxysilane, methyltrimethoxysilane, methyltriethoxysilane, and silanes having the formulas:
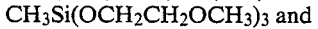
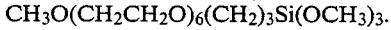

If, in addition to the organopolysiloxanes of this invention, cross-linking agents are used in the method of this invention to make textile fibers hydrophilic, then they are preferably used in an amount of from 3 to 30 weight percent based on the weight of the organopolysiloxanes used.

The cross-linking agents can be applied prior to, simultaneously with, or after the organopolysiloxanes have been applied to the fibers to render them hydrophilic. Preferably, they are applied to the fibers simultaneously with the organopolysiloxanes of this invention. They may be applied separately or in admixture with the organopolysiloxanes and more preferably in admixture with the organopolysiloxanes to render the fibers hydrophilic.

Any catalyst which promotes condensation of Si-bonded groups capable of undergoing condensation can be used as a catalyst for cross-linking the organopolysiloxanes of this invention. Examples of suitable catalysts are in particular, carboxylic acid salts of tin or zinc, where the hydrocarbon radicals are bonded directly to these metals, such as dibutyltin dilaurate, tin octoates, di-2-ethylhexyltin dilaurate, and zinc octoates. Other examples of catalysts which promote the condensation of Si-bonded groups capable of undergoing condensation are alkoxytitanates, tetra-n-butyl titanate, triethanolamine titanate, and zirconium compounds.

When catalysts, which promote the condensation of Si-bonded groups capable of undergoing condensation are used in addition to the organopolysiloxanes of this invention and cross-linking agents, if appropriate, in the method of this invention to render textile fibers hydrophilic, then they are preferably used in an amount of from about 3 to 30 weight percent based on the weight of the organopolysiloxanes.

A satisfactory adherence of the organopolysiloxanes of this invention to the fibers which are to be rendered hydrophilic takes place even at room temperature within from 5 hours to 5 days and this can be accelerated considerably by heating to, for example, 50° to 180° C.

In addition to the organopolysiloxanes of this invention, diluents for the organopolysiloxanes, such as water, as well as cross-linking agents and other textile finishing agents can also be used, if desired, in the method of this invention. An example of a textile finishing agent which is preferably used in the treatment of cellulose fibers, is dimethyloldihydroxyethylene urea (DMDHEU) in admixture with zinc nitrate.

In the following examples, all parts and percentages are by weight unless otherwise specified.

EXAMPLE 1

(a) A mixture containing 2095 g (9.03 mol) of an allyl polyglycol having the formula:

$$CH_2=CHCH_2(OCH_2CH_2)_3OCOCH_3,$$

350 g of tetrahydrofuran, 350 g of acetone, and 350 g of isopropanol and 42 g of a 1 percent solution of platinum, calculated as the element, in the form of $H_2PtCl_6.6H_2O$ in isopropanol is heated to reflux temperature (approximately 90° C.). Over a period of one hour, 522 g of $(CH_3)_3Si(OSiHCH_3)_{70}OSi(CH_3)_3$ (8.4 mol SiH) in 500 ml of toluene is added dropwise. After refluxing for an additional hour, all Si-bonded hydrogen atoms have disappeared according to the $^1$H-NMR spectrum.

(b) The solution produced in accordance with Example 1(a) is mixed with 243 g of concentrated hydrochloric acid (2.53 mol HCl) and immediately afterwards with 87 g (0.49 mol) of methyltriethoxysilane and refluxed for one hour. Subsequently, 150 g of magnesium oxide are added to the mixture to neutralize the acid. After filtering, the solvents are distilled off at 80° C. and at 2 mbar (abs.). About 2460 g of a light yellow, clear liquid having a viscosity of 400 mPa.s at 25° C. is obtained.

According to the $^{29}$Si-NMR spectrum, the organopolysiloxane contains 20 mol percent siloxane units with only one SiC-bonded methyl radical.

EXAMPLE 2

(a) A mixture containing 1600 g (4.4 mol) of an allyl polyglycol having the formula:

$$CH_2=CHCH_2(OCH_2CH_2)_6OCOCH_3,$$

23 g of a 1 percent solution of platinum, calculated as the element, in the form of $H_2PtCl_6.6H_2O$ in isopropanol, and 0.5 g of water (0.028 mol) is heated to 100° C. Over a period of one hour, 240 g of $(CH_3)_3Si(OSiHCH_3)_{70}OSi(CH_3)_3$ (4 mol SiH) in 500 ml of toluene are added dropwise. After refluxing for an additional hour, all Si-bonded hydrogen atoms have disappeared according to the $^1$H-NMR spectrum.

(b) To 900 g of the organopolysiloxane solution prepared in Example 2(a) above, is added 51.5 g of 1N hydrochloric acid (0.051 mol HCl). The resultant mixture is stirred at 90° C. for 2 hours. Subsequently, 10 g of magnesium oxide are added to the mixture to neutralize the acid. After filtering, the solvents are distilled off at 80° C. and at 2 mbar (abs.). About 660 g of a brownish, clear liquid is obtained having a viscosity of 250 mPa.s at 25° C.

According to the $^{29}$Si-NMR spectrum, the organopolysiloxane contains 30 mol percent siloxane units with only one SiC-bonded methyl radical.

EXAMPLE 3

(a) About 35 parts of an organopolysiloxane having SiC-bonded oxyalkylene units and Si-bonded hydroxyl groups, whose preparation was described in Example 1(b) above, is dispersed in a mixture containing 3 parts of a 30 percent aqueous solution of a commercial alkylsulfonate as an emulsifier ("Mersolat", a registered trademark) and 62 parts water.

(b) A fabric whose warp threads consist of 100 percent staple polyester yarn and whose filling threads consist of 100 percent polyester filament yarn is immersed in the aqueous dispersion which contains 57 g/liter of the emulsion whose preparation was described in 3(a) above and which is even more dilute than the emulsion whose preparation was described in 3(a). The fabric is then squeezed to 100 percent liquid uptake so that after drying, the weight increase of the fabric is 2 percent based on the weight of the fabric before treatment and is heated for 3 minutes at 150° C. The treated fabric has a soft, resilient hand.

The wettability is tested in accordance with the procedure described in AATCC 39-1977. In this test, 3 drops of water are applied from a burette onto the fabric under tension in a frame and the time required for the water drops to penetrate the fabric is measured. This time is designated as the "wetting time".

Laundering of the fabrics at 60° C. is carried out in a household washing machine with a commercial detergent. After washing, the fabric is thoroughly rinsed with water to remove any hydrophilic detergent residues.

The following results are obtained:

| Number of 60° C. launderings | 0 | 1 | 2 |
|---|---|---|---|
| Wetting time in seconds | 18 | 65 | 101 |

EXAMPLE 4

The procedure described in Example 3(b) above is repeated except that the dispersion into which the fabric is immersed also contains 6 percent based on the weight of the organopolysiloxane of a silane having the formula:

H₂N(CH₂)₂NH(CH₂)₃Si(OCH₃)₃ and 4.5 percent based on the weight of the organopolysiloxane of triethanolamine titanate. The treated fabric has a soft, resilient hand. With regard to wettability, the following results were obtained:

| Number of 60° C. launderings | 0 | 1 | 2 |
|---|---|---|---|
| Wetting time in seconds | 21 | 20 | 23 |

EXAMPLE 5

(a) The procedure described in Example 3(a) above is repeated except that 35 parts of the organopolysiloxane whose preparation was described in Example 2(b) above and 65 parts of water are used instead of the mixture containing 3 parts of emulsifier solution and 62 parts water. Also, a solution is prepared rather than an emulsion.

(b) The procedure described in Example 3(b) above is repeated except that instead of the emulsion, the solution prepared in accordance with Example 5(a) is used and this solution also contains 6 percent based on the weight of the organopolysiloxane of a silane having the formula:

CH₃Si(OCH₂CH₂OCH₃)₃ and 4.5 percent based on the weight of the organopolysiloxane of triethanolamine titanate. The fabric treated in this manner has a soft, resilient hand. With regard to wettability, the following results are obtained:

| Number of 60° C. launderings | 0 | 1 | 2 | 3 | 4 | 5 |
|---|---|---|---|---|---|---|
| Wettability in seconds | 20 | 23 | 25 | 27 | 26 | 28 |

EXAMPLE 6

A 35 percent cotton and 65 percent polyester fabric is immersed in an aqueous solution containing
60 g/liter of a 45 percent aqueous solution of DMDHEU;
12 g/liter of zinc nitrate;
10 g/liter of the organopolysiloxane prepared in accordance with Example 2(b) above,
and subsequently squeezed to 100 percent liquid uptake and finally heated for 10 minutes at 150° C. The fabric treated in this manner has a soft, resilient hand. With regard to wettability, the following results are obtained.

| Number of 60° C. launderings | 0 | 1 | 2 | 3 | 4 | 5 |
|---|---|---|---|---|---|---|
| Wetting time in seconds | 3 | 6 | 6 | 7 | 6 | 5 |

EXAMPLE 7

A 100 percent cotton fabric is immersed in a solution containing
100 g/liter of a 45 percent aqueous solution of DMDHEU;
20 g/liter of zinc nitrate;
15 g/liter of the organopolysiloxane prepared in accordance with Example 2(b) above
and then squeezed to 100 percent liquid uptake and finally heated for 10 minutes at 150° C. The fabric has a soft, resilient hand. With regard to wettability, the following results are obtained:

| Number of 60° C. launderings | 0 | 1 | 2 | 3 | 4 | 5 |
|---|---|---|---|---|---|---|
| Wetting time in seconds | 4 | 2 | 3 | 2 | 2 | 2 |

Comparison Experiment

Fabrics of the type described in Example 3 are immersed in an aqueous solution such as that described in German Offlegungsschrift 30 39 721, which contains:

15 g/liter of an organopolysiloxane which has an Si-bonded hydroxyl group in each of its terminal units and consists of 6.7 mol percent of methylvinylsiloxane units, 60 mol percent [acetoxy-(hexaethyleneoxy)-propyl]methylsiloxane units, and 33.3 percent of dimethylsiloxane units, 5 g/liter of an organopolysiloxane which has an Si-bonded hydroxyl group in each of its terminal units and contains 33.3 mol percent methylhydrogensiloxane units, 33.3 mol percent of [acetoxy-hexaethyleneoxy)-propyl]methylsiloxane units, and 33.3 mol percent of dimethylsiloxane units and 1 g/liter of an aqueous solution containing 1 percent platinum, calculated as the element, in the form of PtCl₄ and then squeezed to 100 percent liquid uptake and finally heated at 150° C. for 10 minutes. With regard to wettability, the following results are obtained:

| | Number of 60° C. launderings | | | | | |
|---|---|---|---|---|---|---|
| | 0 | 1 | 2 | 3 | 4 | 5 |
| Wetting time in seconds | 80 | 140 | 180 | 270 | >300 | >300 |
| Wetting time for fabrics without finish | >300 | >300 | >300 | >300 | >300 | >300 |

What is claimed is:

1. Organopolysiloxanes having SiC-bonded oxyalkylene units and Si-bonded hydroxyl groups, in which an average of at least 15 mol percent of the siloxane units have only one SiC-bonded monovalent organic radical and the silicon valences other than the one satisfied by the SiC-bonded monovalent organic radical are satisfied by groups selected from the class consisting of siloxane oxygen atoms and oxygen atoms of hydroxyl groups.

2. The organopolysiloxanes of claim 1, wherein the organopolysiloxanes have an average of up to 60 mol percent of siloxane units having only one SiC-bonded monovalent organic radical and the silicon valences other than the one satisfied by the SiC-bonded monovalent organic radical are satisfied by groups selected from the class consisting of siloxane oxygen atoms and oxygen atoms of hydroxyl groups.

3. A method for preparing organopolysiloxanes having SiC-bonded oxyalkylene units and Si-bonded hydroxyl groups, in which an average of at least 15 mol percent of the siloxane units have only one SiC-bonded monovalent organic radical and the silicon valences other than the one satisfied by the SiC-bonded monovalent organic radical are satisfied by groups selected from the class consisting of siloxane oxygen atoms and oxygen atoms of hydroxyl groups, which comprises reacting a triorganosiloxy end-blocked copolymer of a diorgano(poly)siloxane which contains SiC-bonded oxyalkylene units and at least 15 mol percent of siloxane units in which each siloxane unit has one SiC-bonded monovalent organic radical and one group selected from the class consisting of an Si-bonded hydrogen atom, an Si-bonded hydroxyl group and an -SiOC-bonded alkoxy group having from 1 to 4 carbon atoms with water in the presence of an acid or base.

4. A method for preparing organopolysiloxanes having SiC-bonded oxyalkylene units, in which an average of at least 15 mol percent of the siloxane units have only one SiC-bonded monovalent organic radical and the silicon valences other than the one satisfied by the SiC-bonded monovalent organic radical are satisfied by groups selected from the class consisting of siloxane oxygen atoms and oxygen atoms of hydroxyl groups, which comprises reacting a triorganosiloxy endblocked diorgano(poly)siloxane which contains SiC-bonded oxyalkylene units with water in the presence of an acid or base and then reacting the resultant organopolysiloxane with a silicon compound selected from the group consisting of a silane whose silicon atom contains only one SiC-bonded monovalent organic radical and the silicon valences other than the one satisfied by the SiC-bonded monovalent organic radical are satisfied by radicals selected from the group consisting of hydrolyzable radicals and halogen atoms, and partially hydrolyzed products of said silane in an amount sufficient to provide an organopolysiloxane in which an average of at least 15 mol percent of the siloxane units have only one SiC-bonded monovalent organic radical.

5. The method of claim 4, wherein the organopolysiloxane is simultaneously reacted with water and a silicon compound selected from the group consisting of a silane whose silicon atom contains only one SiC-bonded monovalent hydrocarbon radical in which the silicon valences other than the one satisfied by the SiC-bonded monovalent hydrocarbon radical are satisfied by radicals selected from the group consisting of hydrolyzable radicals and halogen atoms and partially hydrolyzed products of said silane.

6. The method of claim 3, wherein water is present in an amount of from 0.1 to 20 weight percent based on the weight of the organopolysiloxane.

7. The method of claim 3, wherein the acid or base is present in an amount of from 0.05 to 10 weight percent based on the weight of the organopolysiloxane.

8. The method of claim 3, wherein the reaction is carried out in the presence of hydrogen chloride.

9. A method for rendering textile fibers hydrophilic which comprises applying to the textile fibers an organopolysiloxane having SiC-bonded oxyalkylene units and Si-bonded hydroxyl groups, in which an average of at least 15 mol percent of the siloxane units have only one SiC-bonded monovalent organic radical and the silicon valences other than the one satisfied by the SiC-bonded monovalent organic radical are satisfied by groups selected from the class consisting of siloxane oxygen atoms and oxygen atoms of hydroxyl groups.

10. The method of claim 9, wherein an agent is added to impart a "durable-press" finish.

11. A method for preparing organopolysiloxanes having SiC-bonded oxyalkylene units, in which an average of at least 15 mol percent of the siloxane units have only one SiC-bonded monovalent organic radical and the silicon valences other than the one satisfied by the SiC-bonded monovalent organic radical are satisfied by groups selected from the class consisting of siloxane oxygen atoms and oxygen atoms of hydroxyl groups, which comprises reacting a triorganosiloxy endblocked copolymer of a diorgano(poly)siloxane which contains SiC-bonded oxyalkylene units and less than 15 mol percent of siloxane units in which each siloxane unit has one SiC-bonded monovalent organic radical and one group selected from the class consisting of an Si-bonded hydrogen atom, an Si-bonded hydroxyl group and an SiOC-bonded alkoxy group having from 1 to 4 carbon atoms with water in the presence of an acid or base and then reacting the resultant organopolysiloxane with a silicon compound selected from the group consisting of a silane whose silicon atoms contain only one SiC-bonded monovalent organic radical and the silicon valences other than the one satisfied by the SiC-bonded monovalent organic radical are satisfied by radicals selected from the group consisting of hydrolyzable radicals and halogen atoms, and partially hydrolyzed products of said silane in an amount sufficient to provide an organopolysiloxane in which an average of at least 15 mol percent of the siloxane units have only one SiC-bonded monovalent organic radical.

12. The method of claim 11, wherein the organopolysiloxane is simultaneously reacted with water and a silicon compound selected from the group consisting of a silane whose silicon atom contains only one SiC-bonded monovalent hydrocarbon radical in which the silicon valences other than the one satisfied by the SiC-bonded monovalent hydrocarbon radical are satisfied by radicals selected from the group consisting of hydrolyzable radicals and halogen atoms and partially hydrolyzed products of said silane.

13. The method of claim 4, wherein water is present in an amount of from 0.1 to 20 weight percent based on the weight of the organopolysiloxane.

14. The method of claim 11, wherein water is present in an amount of from 0.1 to 20 weight percent based on the weight of the organopolysiloxane.

15. The method of claim 4, wherein the acid or base is present in an amount of from 0.05 to 10 weight percent based on the weight of the organopolysiloxane.

16. The method of claim 11, wherein the acid or base is present in an amount of from 0.05 to 10 weight percent based on the weight of the organopolysiloxane.

17. The method of claim 4, wherein the reaction is carried out in the presence of hydrogen chloride.

18. The method of claim 11, wherein the reaction is carried out in the presence of hydrogen chloride.

* * * * *